June 16, 1925.                    H. P. KRAFT                    1,542,064
                                   DUST CAP
                             Filed Dec. 24, 1920
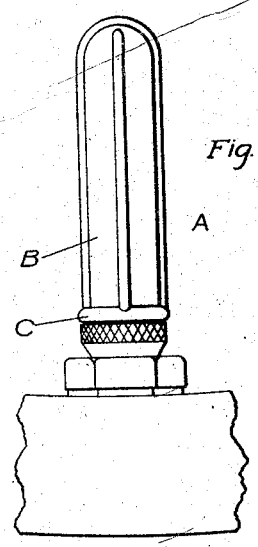
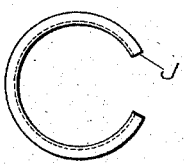
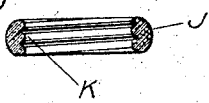
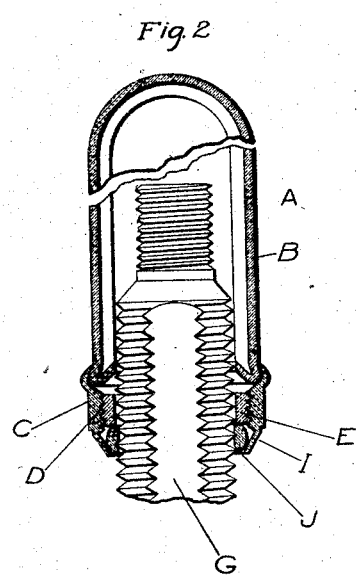
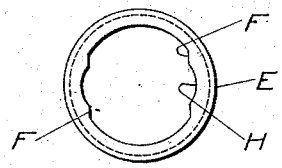
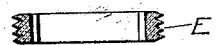
INVENTOR
Henry P. Kraft
BY
ATTORNEY Patented June 16, 1925.

1,542,064

UNITED STATES PATENT OFFICE.

HENRY P. KRAFT, OF RIDGEWOOD, NEW JERSEY; EDGAR J. PHILLIPS AND EARL A. DARR EXECUTORS OF THE WILL OF SAID HENRY P. KRAFT, DECEASED.

DUST CAP.

Application filed December 24, 1920. Serial No. 432,966.

*To all whom it may concern:*

Be it known that I, HENRY P. KRAFT, a citizen of the United States of America, residing in Ridgewood, in the county of Bergen and State of New Jersey, have invented certain new and useful Improvements in Dust Caps, of which the following is a specification.

This invention relates to dust caps for tire valves or the like, and is particularly directed to an improved construction of quick detachable cap of the type which is clamped to the tire valve by a ring-shaped clamp which is adapted to be wedged radially inward during the act of application. The object of the present invention is to provide a more easily operated and smoothly-working clamp, and also one which has a very effective grip upon the tire valve or similar structure to which it is applied. To this end the invention comprises a construction in which the clamping member is of general ring-shaped form, and preferably in the form of a split ring, the inner or engaging face of the clamping member being threaded. The thread thus formed may match that of the tire valve, but I prefer to make it of less depth than the thread on the valve, whereby it may engage the latter without the necessity of so great an expansion and contraction as would be necessary in passing over the threads of the valve casing, and in closely engaging the same.

In the drawing, which illustrates one form of the invention,—

Figure 1 is an elevation of the improved cap shown in position on the valve stem.

Fig. 2 is a diametrical section on an enlarged scale.

Fig. 3 is a plan of the ring-shaped clamping member.

Fig. 4 is a sectional view thereof.

Fig. 5 is a plan of the screw-threaded member for operating the clamp.

Fig. 6 is a section.

Referring to the drawings, let A indicate the cap as a whole which is shown as comprising two portions B and C, fastened together by overlapping one part upon the other. This construction of cap is illustrated in a prior application filed by me December 19, 1919, and serially numbered 346,018.

The lower portion C has an internal thread D, which thread is engaged by a screw-threaded collar E, having flats F (Fig. 5) designed to engage the flats G of the valve casing. Notches H may be provided in the flats in order to permit the collar E to slip down easily over a valve casing which has a valve cap in place thereon.

The lower portion C is provided with an internal tapered or bevelled face I preferably made by turning the metal inward, as best shown in Fig. 2.

The clamping member J is preferably in the form of a split ring, best shown in Figs. 3 and 4, and is located between the bottom face of the collar E and the wedging face I of the part C. It may, however, be located in any position with regard to two approaching surfaces which will give the necessary inward movement. In the construction shown, as the cap A is rotated, the collar E is held from rotation, and is forced downwardly against the clamping member, thus pressing the same against the wedging face I and causing the clamping member to contract circumferentially, and thereby decrease its diameter in such manner as to clamp the threads of the valve casing.

According to the present invention, the clamping member is provided with threads, such as K, which, however, need not be the full depth of the threads of the valve casing. By making the threads shallower, the degree of expansion and contraction which is necessary to release the valve threads and engage them is not necessarily so great as would be the case if the threads of the clamping member were full depth.

The construction shown secures a very firm clamping action without the exercise of considerable force in tightening the cap, and also permits an easier release of the cap upon a reverse rotation thereof.

While I have shown and described one form of the invention, it will be understood that I do not wish to be limited thereto, since various changes within the scope of the appended claim may be made therein without departing from the spirit of the invention. The invention may be applied to other devices than dust caps.

What I claim is:—

A dust cap or the like, having a clamping ring, and means for forcibly contracting the same to clamp the cap to a valve casing or the like, said clamping ring having a threaded interior, and the threads of the ring being of less depth than the threads of the valve casing.

In witness whereof, I have hereunto signed my name.

HENRY P. KRAFT.

Witnesses:
JOHN HOERGER,
CHARLES HEGELEIN.